(12) United States Patent
Landreth (10) Patent No.: US 6,625,504 B2
(45) Date of Patent: Sep. 23, 2003

(54) AUXILIARY POWER UNIT ENGINE MONITORING SYSTEM (75) Inventor: Homer W. Landreth, Peoria, AZ (US)

(73) Assignee: Honeywell International Inc., Morristown, NJ (US)

( * ) Notice: Subject to any disclaimer, the term of this patent is extended or adjusted under 35 U.S.C. 154(b) by 336 days.

(21) Appl. No.: 09/816,594

(22) Filed: Mar. 22, 2001

(65) Prior Publication Data

US 2002/0138158 A1 Sep. 26, 2002

(51) Int. Cl.[7] .............................................. G05B 15/00
(52) U.S. Cl. .......................................... 700/83; 701/29
(58) Field of Search ............................ 700/19, 20, 79, 700/83; 701/29; 340/825.22, 3.1

(56) References Cited

U.S. PATENT DOCUMENTS

| | | |
|---|---|---|
| 5,033,010 A | 7/1991 | Lawrence et al. |
| 5,067,099 A | 11/1991 | McCown et al. |
| 5,077,670 A | 12/1991 | Takai et al. |
| 5,111,402 A | 5/1992 | Brooks et al. |
| 5,146,160 A | 9/1992 | Pinkston |
| 5,318,449 A | 6/1994 | Schoell et al. |
| 5,367,459 A | 11/1994 | Shtarkman et al. |
| 5,442,553 A | * 8/1995 | Parrillo ........................ 455/420 |
| 5,617,039 A | 4/1997 | Kuck et al. |
| 5,659,680 A | 8/1997 | Cunningham et al. |
| 5,884,202 A | 3/1999 | Arjomand |
| 5,916,287 A | 6/1999 | Arjomand et al. |
| 5,970,251 A | 10/1999 | Zimmermann et al. |
| 5,986,462 A | 11/1999 | Thomas et al. |
| 6,032,089 A | 2/2000 | Buckley |
| 6,064,721 A | 5/2000 | Monammadian et al. |

* cited by examiner

Primary Examiner—Ramesh Patel
Assistant Examiner—Ronald D Hartman, Jr.
(74) Attorney, Agent, or Firm—Robert Desmond, Esq.

(57) ABSTRACT

A method and an engine monitoring and control system is provided. The system includes a tested unit having a symbol table with addresses of monitored and controlled parameters, an external portable personal computer having a memory, a display and a graphical user interface (GUI) responsive to user commands, and a communication link between the tested unit and the personal computer. The GUI is used for creating a customized set of application-specific GUI display pages with icons and text, for displaying received parameter values, and for selecting commands and parameters from the displayed pages. The computer executes a monitoring software program including a set of computer-executable program instructions for retrieving the tested unit parameter values and controlling the tested unit performance. The memory receives the symbol address table before the test, and the monitoring software program dynamically updates the symbol addresses into a global arrays table during the test, by recalculating necessary data locations, if needed. The tested unit is preferably an Auxiliary Power Unit (APU) Electronic Control Unit (ECU). The monitoring software program may be remotely controlled by a remote control system for off-site monitoring and control.

26 Claims, 9 Drawing Sheets

AUXILIARY POWER UNIT ENGINE MONITORING SYSTEM

BACKGROUND OF THE INVENTION

The present invention generally relates to computer-aided troubleshooting systems and, more particularly, to computer-aided troubleshooting systems for auxiliary power units (APU).

APUs are used on a vast number of commercial and military vehicles, such as aircraft, tanks, and other ground vehicles. Their function, in general, is to provide electrical power to operate the vehicle's electronic systems at a significantly lower fuel consumption then when the main engine is used. Other APU functions include charging the batteries, operating the hydraulic system, and providing the compressed air. The APU Electronic Control Unit (ECU) controls the turbine engine by providing the control signals necessary to operate engine servos, valves and relays. The ECU also monitors engine operation using signals from several sensors mounted in the engine.

The air-worthiness of aircraft is dependent upon proper functioning of many interdependent aircraft components. The APUs are typically reliable but are subject to failure. An aircraft cannot take off if the APU is not functioning properly. Most often, to determine the cause of a failure of an APU, maintenance personnel use standard electronic test equipment, such as voltmeters, ohmmeters and oscilloscopes.

There is an increasing need for automated troubleshooting systems, which has prompted many companies to turn to application software to deploy and manage their troubleshooting applications effectively. Quite commonly, these applications are configured to interface with a tested unit in real time, in order to explore, evaluate and implement a corrective action as soon as possible.

Unfortunately, presently there is no existing computer-aided troubleshooting software, loadable in a conventional portable personal computer, that allows customer field service personnel to retrieve the internal information from the unit under test, such as an aircraft APU ECU, in order to facilitate troubleshooting of the malfunctioning unit, which is also capable of controlling the tested unit.

Currently, troubleshooting software applications must be developed to work within a custom designed hardware environment. As a result, application developers frequently find that they have little or no control over which product is to be used to support their applications or how the database is to be designed. In some cases, developers may even find that data critical to their application have to be hard-coded and cannot be dynamically updated. Thus, the developer is forced to turn to more complex (and potentially cumbersome) alternatives to gain access to needed data sources. Often, the alternatives are more costly and time-consuming to implement, require a more sophisticated set of skills to implement, and may consume additional machine resources to execute.

Some presently available troubleshooting software application programs depend on hard coding of previously known unit under test parameter addresses, where data items are stored as results of previously executed program instructions, and are not retrieved from the unit under test during the troubleshooting session. Therefore, the software application program must be modified in order to access different data. Some other software application programs cannot dynamically calculate the necessary data locations, thus preventing the application program from being useable in more than a singular application. Furthermore, if a modification in a software application program is made, it is possible that the wrong data would be accessed after the modification.

Therefore, there is a need for a method and a reusable software module, loadable in a conventional personal computer, which can interface with a tested Auxiliary Power Unit Electronic Control Unit, to provide persistent troubleshooting data, and to facilitate troubleshooting and control of malfunctioning units. This would simplify the design, development, and maintenance of troubleshooting applications and provide applications with a function that would otherwise be inaccessible.

SUMMARY OF THE INVENTION

One aspect of the present invention is an engine monitoring and control system. The system includes a tested unit having a symbol table with addresses of monitored and controlled parameters, an external portable personal computer having a memory, a display and a graphical user interface (GUI) responsive to user commands, and a communication link between the tested unit and the personal computer. The GUI is used for creating customized set of application-specific GUI display pages with icons and text, for displaying received parameter values, and for selecting commands and parameters from the displayed pages. The computer executes a monitoring software program including a set of computer-executable program instructions for retrieving the tested unit parameter values and controlling the tested unit performance. The memory receives the symbol address table before the test and the monitoring software program dynamically updates the symbol addresses into a global arrays table during the test, by recalculating necessary data locations, if needed. The tested unit is preferably an Auxiliary Power Unit (APU) Electronic Control Unit (ECU). The monitoring software program may be remotely controlled by a remote control system for off-site monitoring and control.

Another aspect of the present invention is a method implemented in the above-mentioned system embodiment of the present invention.

DETAILED DESCRIPTION OF THE INVENTION

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a method and a computer-aided troubleshooting software application program, available to field service personnel, for retrieving the internal information from the tested electronic control unit in order to identify malfunctioning units and for controlling the tested unit. The present invention is specifically directed to a method and a system using an Auxiliary Power Unit (APU) Engine Monitoring System (EMS) which is a software application program loadable in a portable personal computer, preferably a laptop or hand-held personal computer. A simplified block diagram of a hardware system embodiment of the present invention is presented in FIG. 1A and FIG. 1B. The APU EMS software program flowcharts are presented in FIGS. 3, 4, 5, 6, 7 and 8.

Figure 1A:
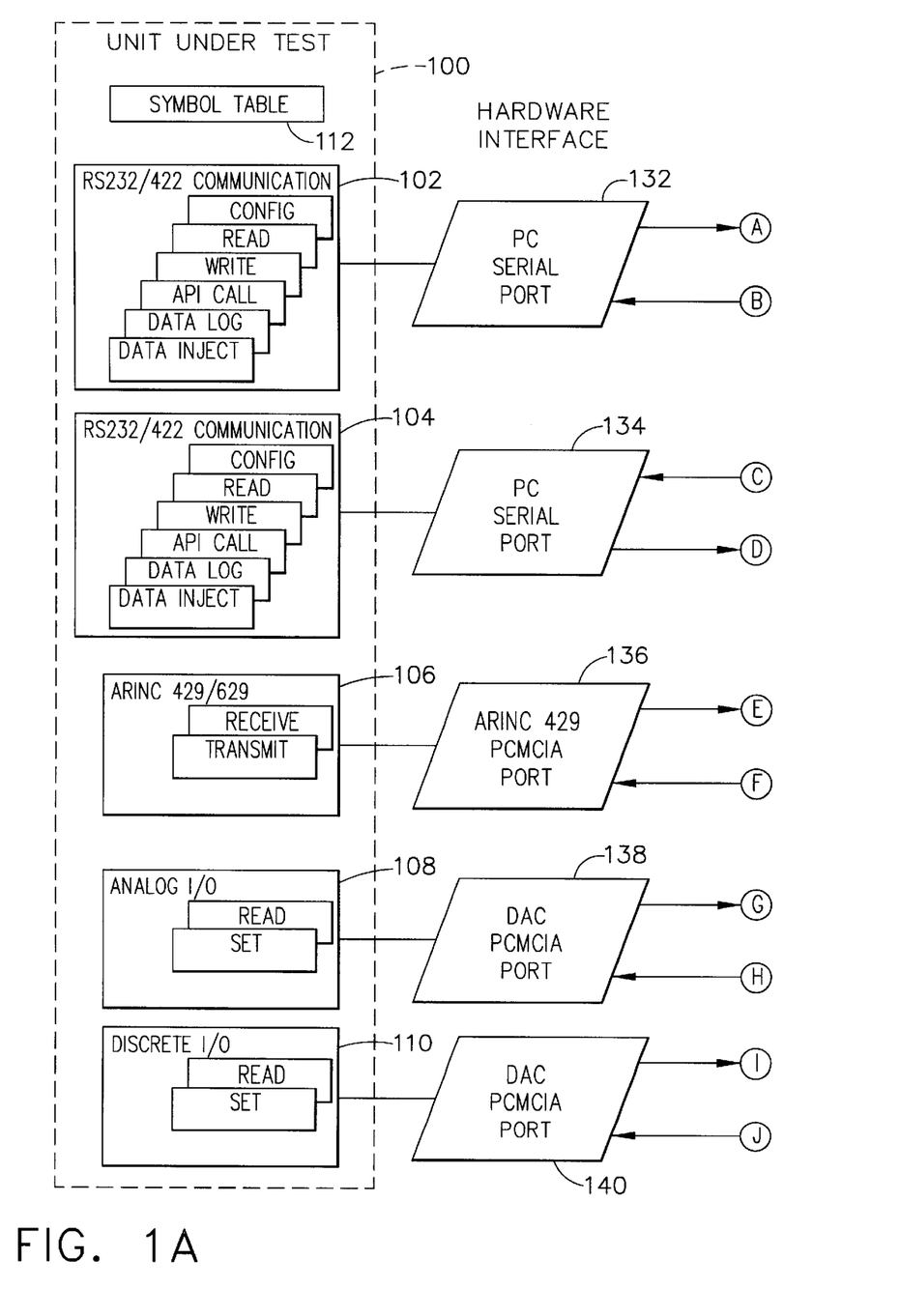
FIG. 1A and FIG. 1B illustrate a simplified block diagram of a hardware system embodiment of the present invention.
Figure 1B:
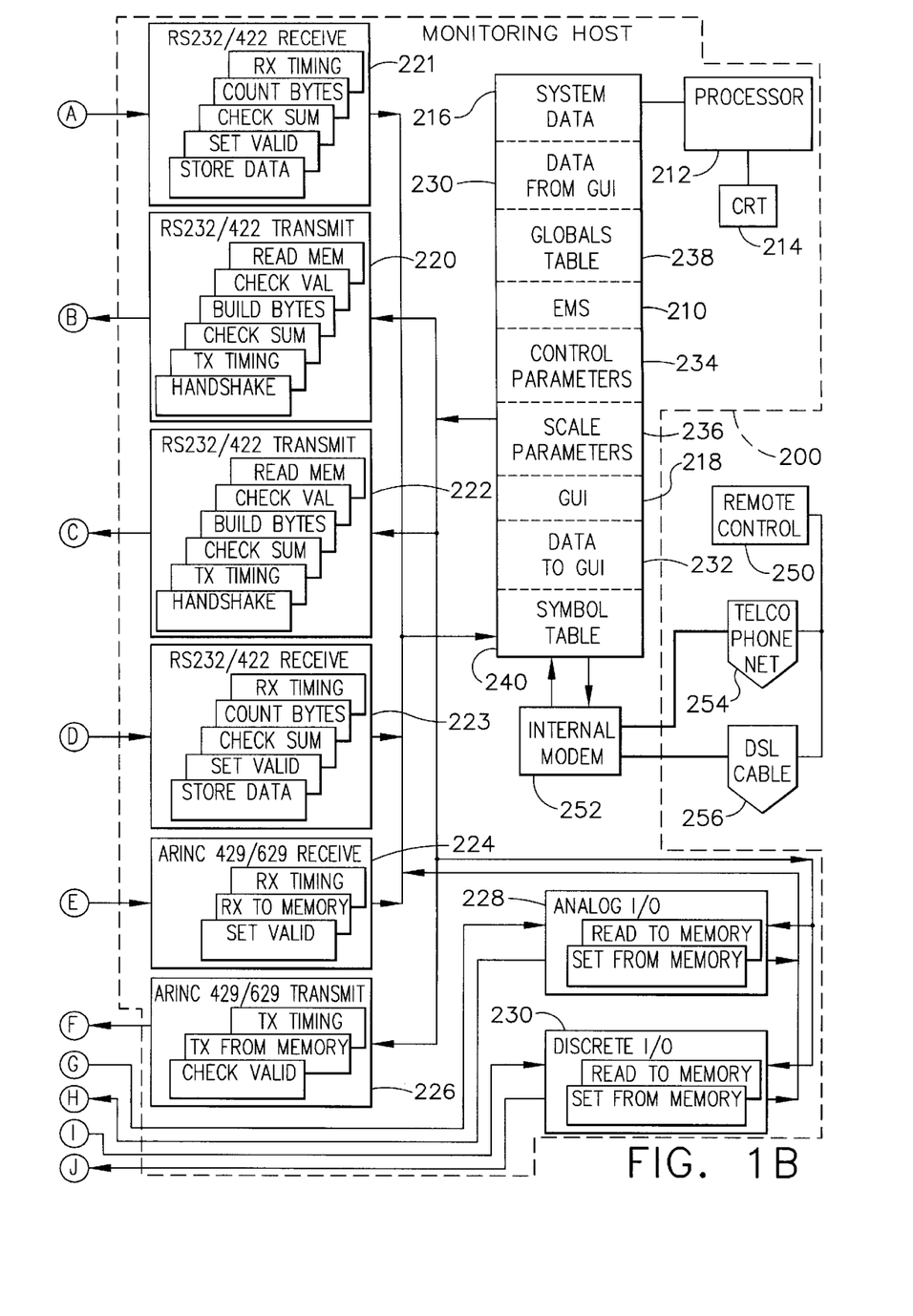

According to FIG. 1A and FIG. 1B, a unit under test 100 is connected, via several interfaces, to a personal computer monitoring host 200, having a monitoring software program EMS 210. The software program EMS 210 of the present invention is installable in a commercially available personal computer with conventional external peripherals and port interfaces, and does not require any special communication interface or data conversion.

Unit under test 100 in the preset invention is preferably an ECU of an APU. In one embodiment of the present invention, it is equipped with two RS232/422 communication interfaces 102, 104, an ARINC 429/629 communication interface 106, an analog I/O interface 108 and a discrete I/O interface 110, although it may have different communication interfaces. Each RS232/422 communication interface 102, 104 is connected via one of two PC serial ports 132, 134 to an RS232/422 transmit communication interface 220, 222 and an RS232/422 receive communication interface 221, 223, respectively, located in the monitoring host 200. The ARINC 429/629 communication interface 106 is connected via an ARINC 429 PCMCIA port 136 to an ARINC 429/629 receive communication interface 224 and an ARINC 429/629 transmit communication interface 226 of the monitoring host 200. The analog I/O interface 108 is connected via a DAC PCMCIA port 138 to an analog I/O communication interface 228 of the monitoring host 200. The discrete I/O interface 110 is connected via a DAC PCMCIA port 140 to a discrete I/O communication interface 230 of the monitoring host 200.

The monitoring host 200 further includes a processor 212 with a standard mass storage device, such as data storage disk (not shown) for permanent storage of computer programs and files; a standard CRT monitor with a display 214; a memory 216 used to temporarily store data and programs during the execution of the EMS software program, such as the EMS 210; and a graphic user interface (GUI) software 218 used to define on the display screen icons and text, data from GUI 230, data to GUI 232, control parameters 234, scale parameters 236 and global arrays table 238. In the preferred embodiment, the user receives information and accomplishes all commands via a set of application-specific GUI display pages presented on the display 214. Data input device (not shown) may be a pointing device, such a mouse, keyboard or a keypad. The display 214 screen may also be touch-sensitive.

The global arrays table 238 is a feature used by the EMS 210 so that it can be dynamically updated by the EMS 210 by recalculation of necessary data locations, if needed. This feature makes the application program EMS 210 useable in more than a singular application, because it allows for a possible modification of the unit under test 100 software and parameter addresses, without a need to modify the EMS 210 code. The global arrays table 238 has arrays of specific instructions which were assembled during the processing of the transmitted copy of a symbol table 112, which was received from the unit under test 100 and stored within the memory of the monitoring host 200. The EMS software program 210 parses the global arrays table 238 to obtain the addresses within the ECU where the parameter values of monitored and/or controlled data items are located within the ECU, in order to use these addresses in the manipulation of data from those locations. The APU EMS 210 runs on the personal computer monitoring host 200 and interrogates and controls the unit under test 100 using one of the supported communication protocols, preferably the RS-232/422 communication protocol, via communication ports 132, 134. The EMS 210 preferably utilizes a Windows-based operating system and is preferably programmed in C computer language and G computer language, as generated by the National Instruments LabView development system.

The APU EMS 210 is not only a monitoring system but also a control system which is capable of exercising all control over the unit under test 100, such as the APU. Thus, it can send control commands, such as for starting and stopping the APU, loading the pneumatic system, downloading the logged faults, changing internal parameter values, etc. According to one embodiment of the present invention, the EMS 210 can be remotely controlled by a remote control system 250, via an internal modem 252, and a telephone company network 254 or a commercial DSL system cable 256 for the Internet or a private supplier access, so that the EMS 210 can be remotely controlled in order to facilitate troubleshooting by off-site engineering personnel.

Figure 2:
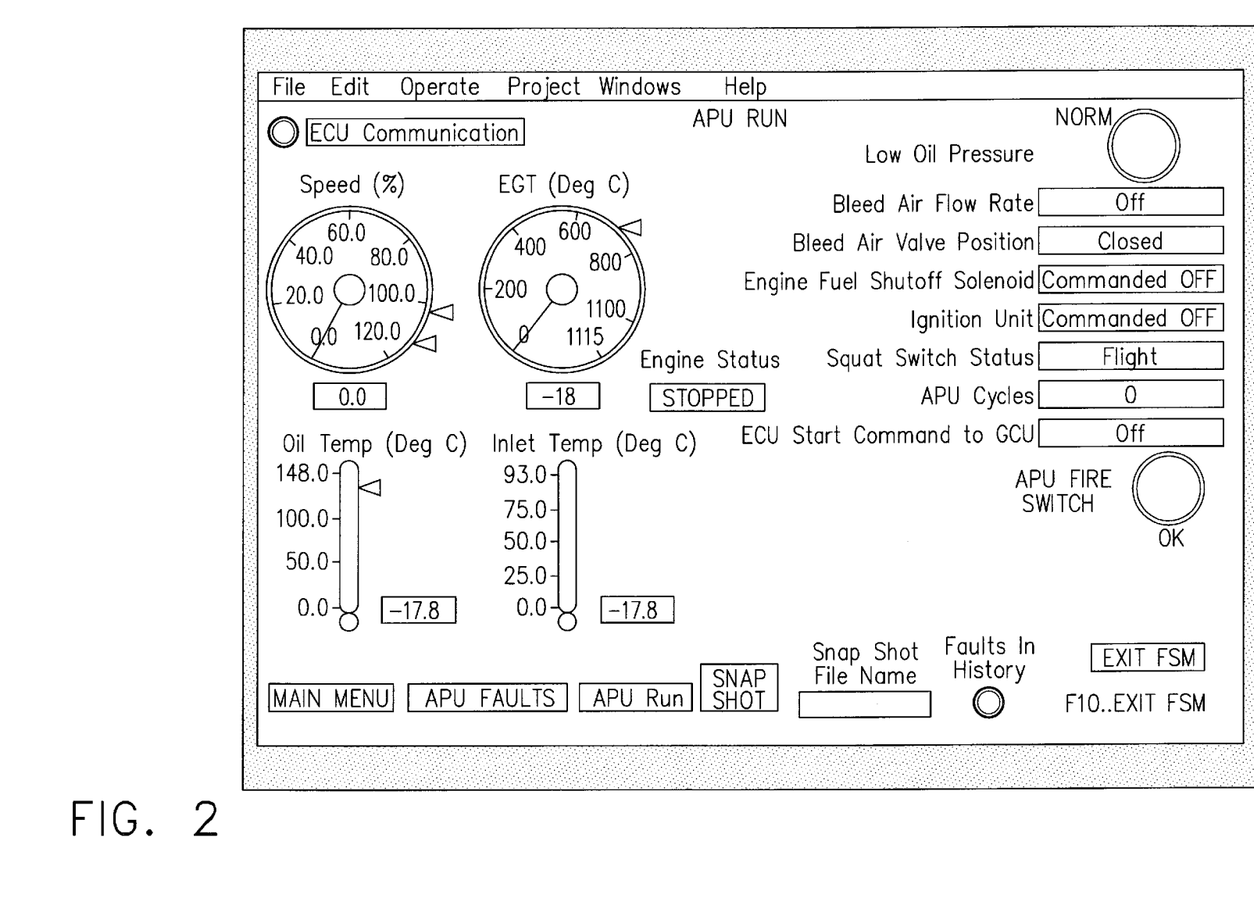
FIG. 2 illustrates a display page showing virtual gauges and instruments, according to a preferred embodiment of the present invention.

FIGS. 3 to 8 illustrate flowcharts of the EMS software application program 210. The EMS 210 is provided to the customer personnel and/or field service engineers as an executable file. The user loads the file into his personal computer monitoring host 200 and activates the EMS 210 through the Windows-based operating system. According to FIG. 3, the program starts in step 302 by initializing the monitoring host 200. In step 304 it displays an initial page that contains a selection menu, which allows the operator to elect to process the symbol table, display virtual gauges and instruments, similar to a page shown in FIG. 2, display a strip chart page, display a page that allows the operator to select the downloading of recorded faults from the unit under test 100. He can also elect to create a display page with general operator queries for extraction of information from the unit under test 100. The initial display page also allows the operator to input the number of a unit under test to be monitored, and the identification number of the required symbol table, to be used for future reference and to determine if downloading and processing of another symbol table is required.

Figure 3:
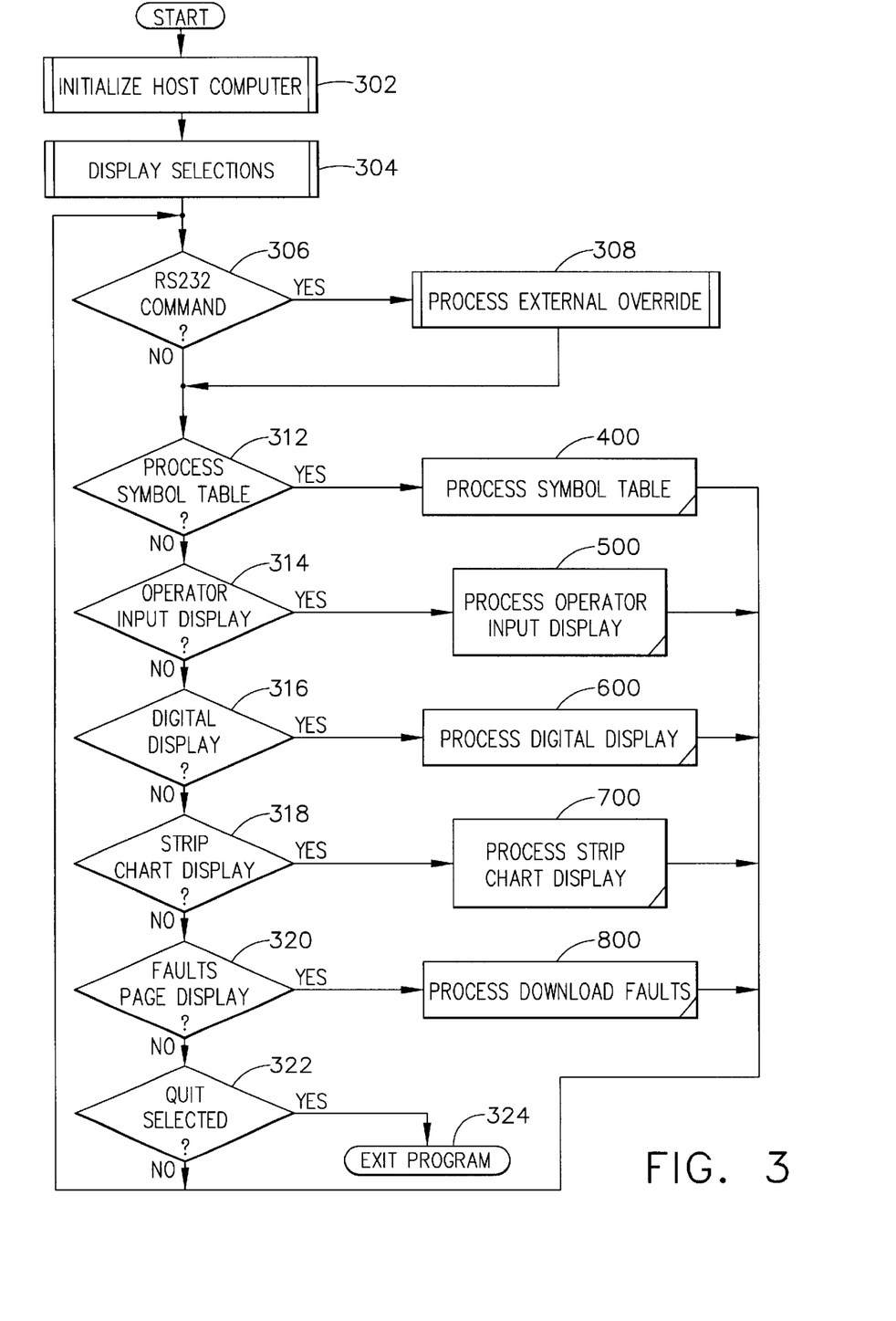
FIGS. 3, 4, 5, 6, 7 and 8 illustrate the APU EMS software program flowcharts of the preferred embodiment of the present invention.

In step 306 it is checked whether an RS-232/422 command is received. If so, in step 308 a process external override module is executed in order to determine whether there is a need to establish communication of the EMS 210 with another host or component via the ARINC 429/629 hardware interface 136, or to execute a command received via the internal modem 252 from the remote control unit 250, for remote control of the EMS 210, or whether there is a need for the operator of the source of the RS-232/422 communication to alter the desired display page. The present invention supports components 106, 136, 224, 226 which are providing communications using the communication bus protocol of Aeronautical Radio Corporation, Inc. 429/629 (ARINC429/629). Since the ARINC429/629 is a communication bus protocol, the present invention can communicate with any other component or host system connected to the communication bus, while communicating with the unit under test 100.

The monitoring host 200 now waits for a response from the operator, or a response via RS/232/422, which will signify the desire to perform one of the specific processes displayed in FIG. 3. Then, a module corresponding to the requested command function is executed. If no action is selected by the operator or via RS-232/422, the monitoring host 200 continues display of the initial available selections and continues monitoring for operator input. If it is chosen in step 312 to process the symbol table 238, a process symbol table module 400 of FIG. 4 is executed.

Figure 5:
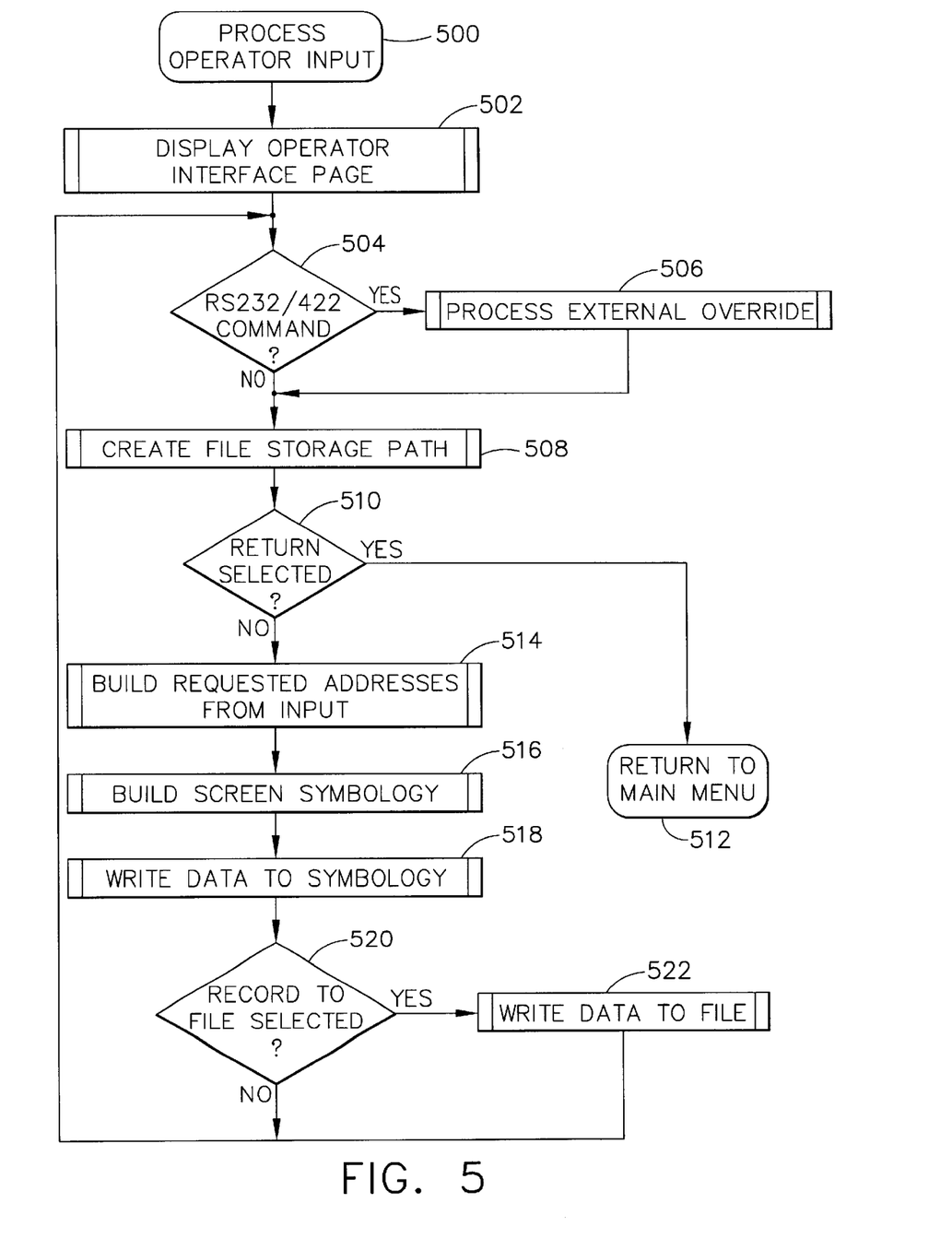
Figure 6:
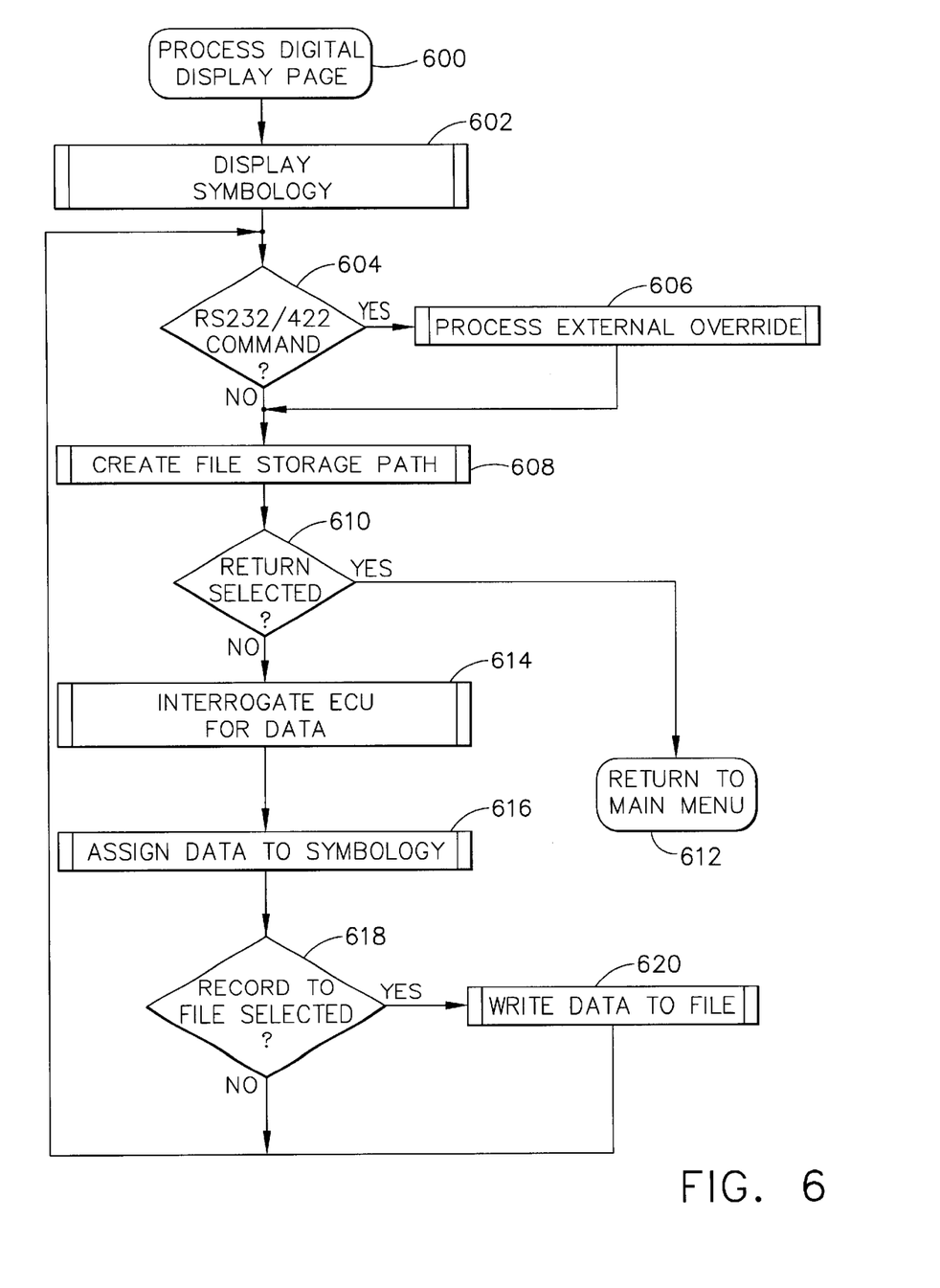
Figure 7:
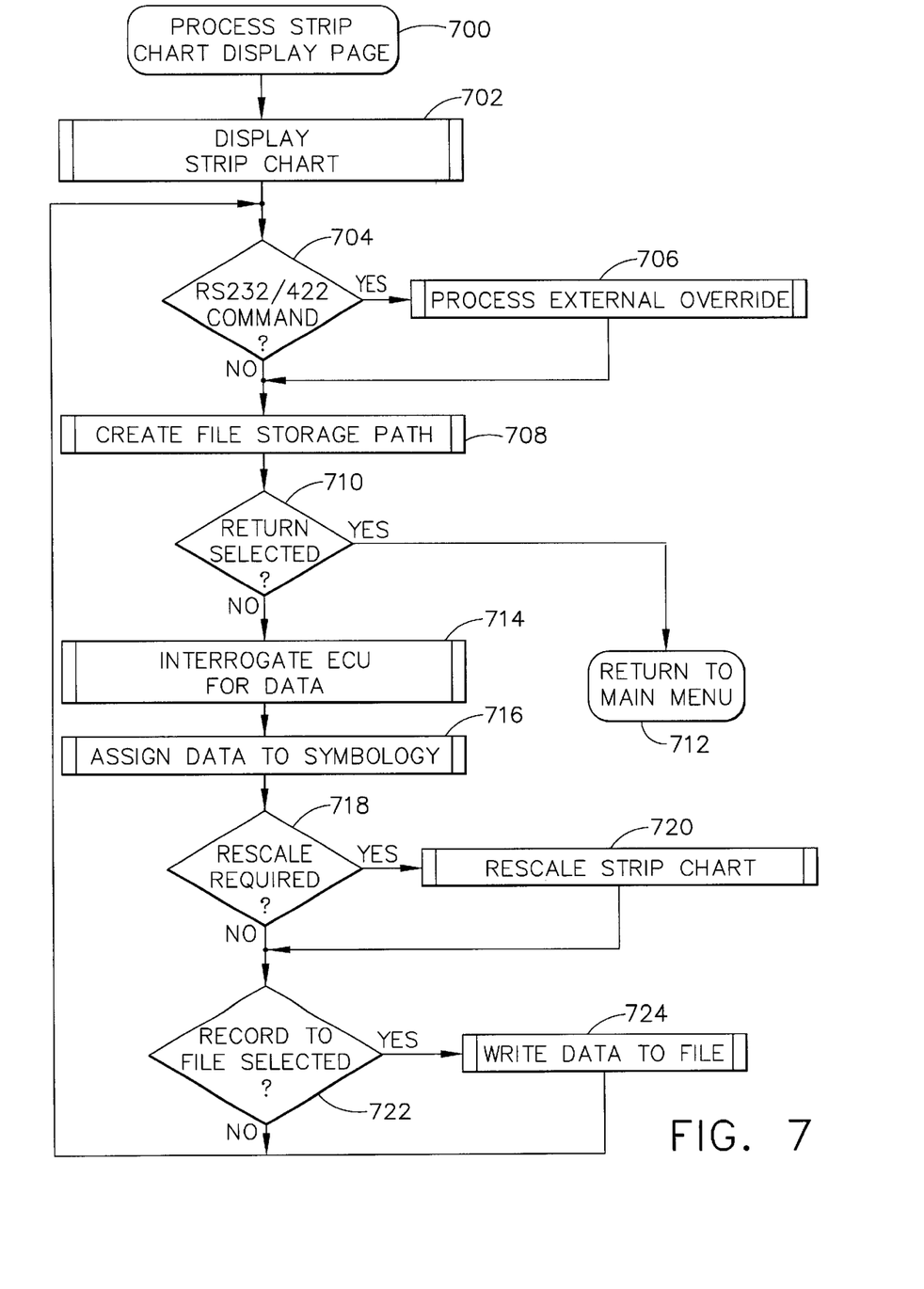
Figure 8:
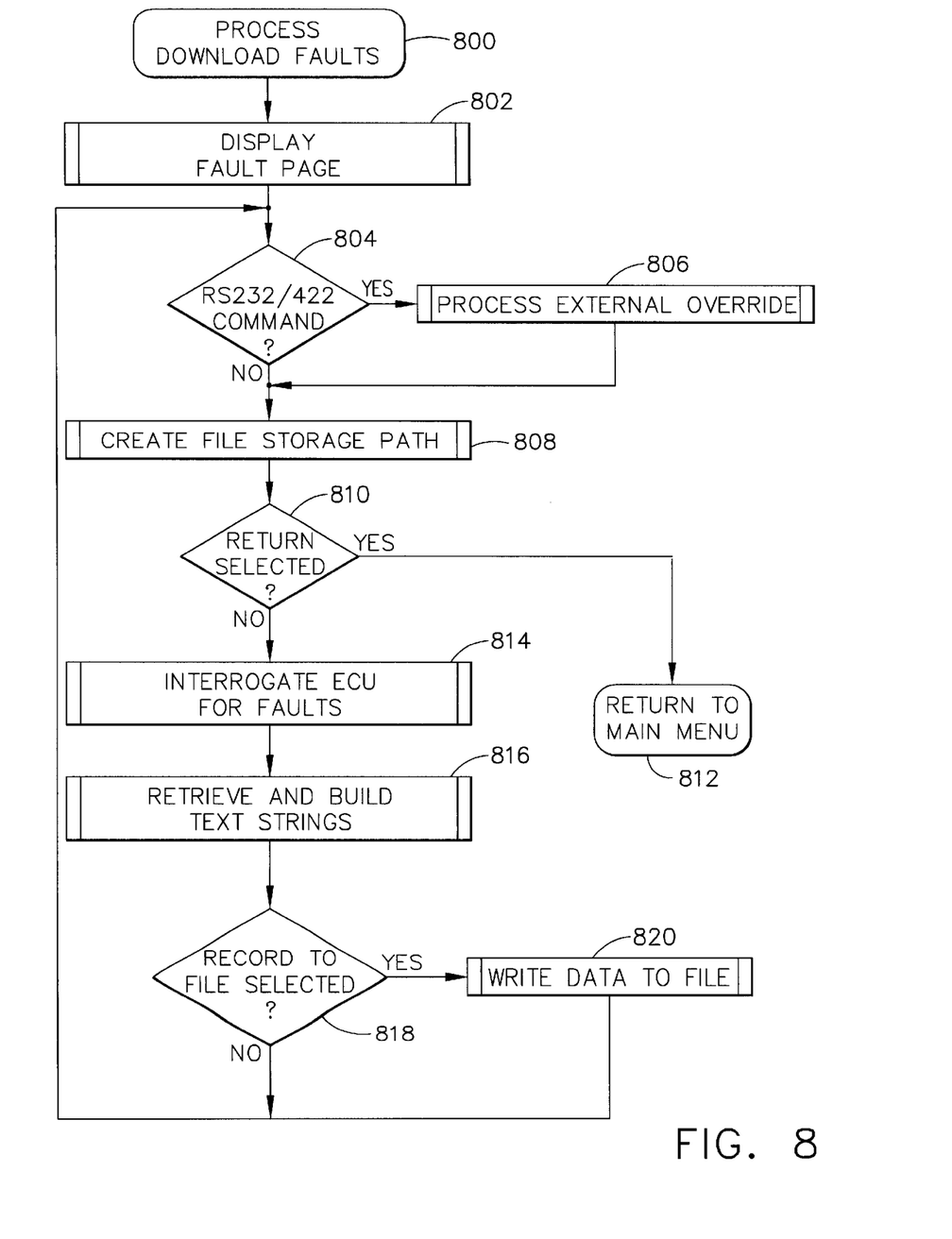

If it is chosen in step 314 to process operator input display, a process operator input display module 500 of FIG. 5 is executed. If it is chosen in step 316 to process digital display, a process digital display module 600 of FIG. 6 is executed. If it is chosen in step 318 to process strip chart display, a process strip chart display module 700 of FIG. 7 is executed. If it is chosen in step 320 to process fault page display, a process download faults module 800 of FIG. 8 is executed. If it is chosen in step 322 to quit, the program exits in step 324. Otherwise, the control returns to step 306 to wait for another command.

Figure 4:
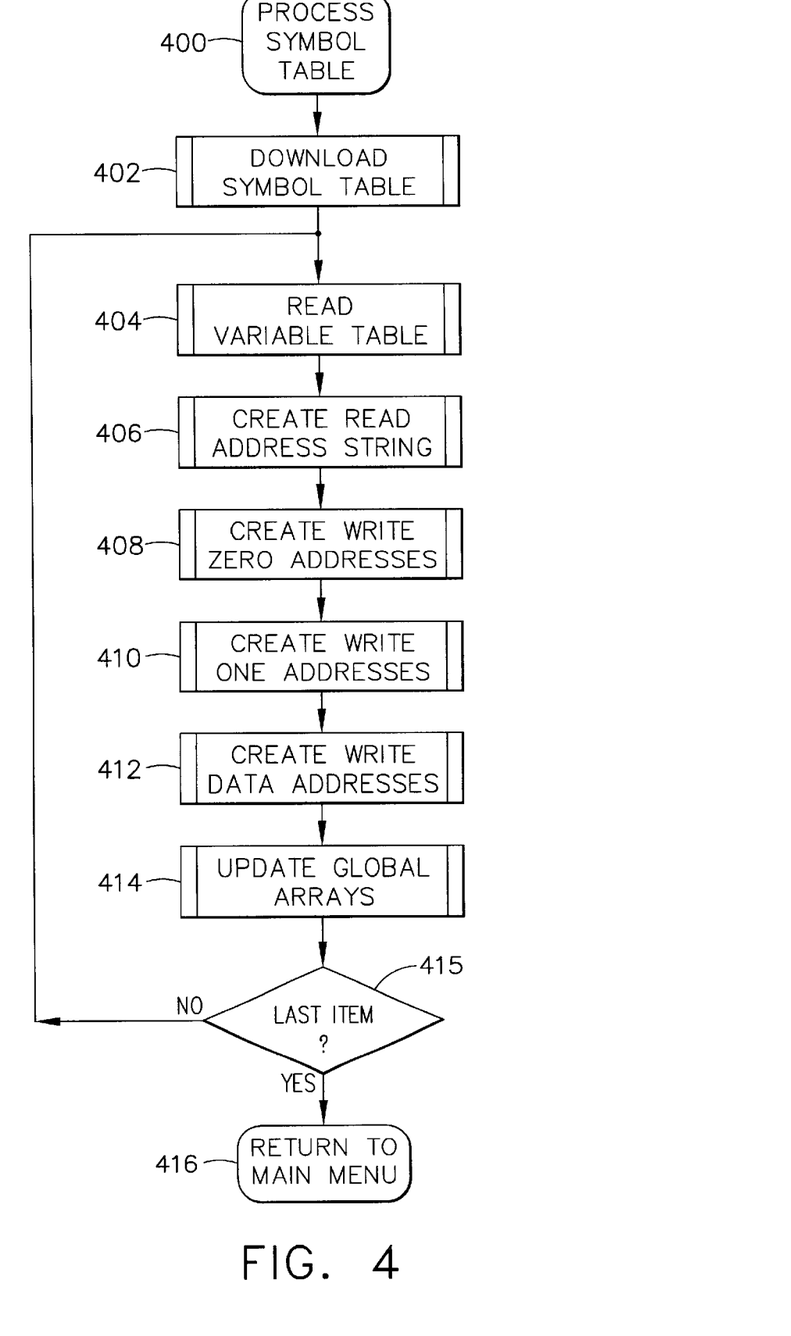

FIG. 4 illustrates steps of the process symbol table module 400 used to update the global arrays table 238. In step 402 the symbol table is downloaded from the unit under test 100 and in step 404 the parameter addresses are read from the symbol table 112. In step 406 a read address string is created to contain a monitored parameter address and a number of bytes sufficient to receive the parameter value. In step 408 write zero addresses are created. Write zero address is a flag useable as a control command to the unit under test 100 to read the parameter value and reset the parameter value to 0. In step 410 write one addresses are created. Write one address is a flag useable as a control command to the unit under test 100 to read the parameter value and set the parameter to another value. In step 412 write data addresses are created, useable to create addresses of parameters to be controlled by the operator's commands.

In step 414 the global arrays table 238 is updated, by changing or deleting some addresses. In step 415 it is tested whether all of the parameters in the symbol table have been processed and stored in the global arrays table 238. If so, the module returns in step 416 to the main menu of FIG. 3. If more symbol table addresses need processing, the processing returns to step 404 to read variable table to commence processing of that address parameter.

FIG. 5 illustrates steps of the process operator input module 500. In step 502 an operator's interface page is displayed containing commands for selection by the operator in creation of a customized display page. In step 504 it is checked whether the command is an RS-232/422 command. If so, in step 506 a process external override module is executed. In step 508 a file storage path is created to a disk file where the customized display page will be stored. If a return command is received in step 510, the module returns in step 512 to the main menu of FIG. 3. If not, in step 514 a module is executed to build addresses corresponding to the command input. In step 516 screen symbology (icons) are created for the customized display page. In step 518 data are added to the icons. If it is selected in step 520 to record the customized display page to the disk file, it is performed in step 522. If not, the control returns to step 504.

FIGS. 6 to 8 are used when it is desirable to update either the strip chart page, the digital gauge display page or the faults download page. For example, the page displaying the virtual gauges and instrument icons displays all the parameters that are required for monitoring the engine run, such as oil pressure, temperatures, engine RPM, input and output discretes, and any control switches that the APU test and control requires. Then the operator starts the unit under test 100 and begins the interaction with the EMS program 210 in order to troubleshoot the unit 100. The displayed parameters are written into a file stored on the disk by the personal computer monitoring host 200. The file may be transmitted to the remote control system 250.

For example, if desired, the operator or the remote control system 250 may select a strip chart data page for display, in order to see time referenced events occurring in conjunction with each other. During the troubleshooting session, the operator or the remote control system 250 may desire the input of a specific set of parameters or controls. A customized display page may be created by the EMS 210, which allows the operator to select specific parameter addresses or symbols for display on that page, for monitoring the selected parameters for data input and data recording. Moreover, while the unit under test 100 is operating, it is logging internal faults into its internal memory. When the EMS 210 display page for downloading faults is selected by the operator, a text string describing the internal faults is displayed, which offers him the opportunity to write the faults to the personal computer file and to transmit the faults to the remote control system 250.

FIG. 6 illustrates steps of the process digital display page module 600. In step 602 the customized display page with symbology is displayed. In step 604 it is checked whether the EIA232 command is received. If so, in step 606 a process external override module is executed. In step 608 a file storage path is created for a disk file where parameter data will be stored. If a return command is received in step 610, the module returns in step 612 to the main menu of FIG. 3. If not, in step 614 a module is executed to interrogate the unit under test 100 for the parameter values. In step 616 the parameter values received from the unit under test 100 are assigned to the screen symbology of the customized display page. If it is selected in step 618 to write a record with the parameter data to the file, it is performed in step 620. If not, the control returns to step 604.

FIG. 7 illustrates steps of the process strip chart display page module 700. In step 702 a display page with strip chart is displayed. In step 704 it is checked whether an EIA232 command is received. If so, in step 706 a process external override module is executed. In step 708 a file storage path is created for a disk file where parameter data will be stored. If a return command is received in step 710, the module returns in step 712 to the main menu of FIG. 3. If not, in step 714 a module is executed to interrogate the unit under test 100 for the parameter values. In step 716 the received data are assigned to the screen symbology of the strip chart display page. If it is selected in step 718 to rescale the parameter values to a different scale, the strip chart is rescaled in step 720. If it is chosen in step 722 to write a record with the parameter data to the file, it is performed in step 724. If not, the control returns to step 704.

FIG. 8 illustrates steps of the process download faults display page module 800. In step 802 a display page with faults is displayed. In step 804 it is checked whether an RS-232/422 command is received. If so, in step 806 a process external override is executed. In step 808 a file storage path is created for a disk file where parameter data will be stored. If a return command is received in step 810, the module returns in step 812 to the main menu of FIG. 3. If not, in step 814 a module is executed to interrogate the unit under test 100 for discovered faults and/or shutdowns. In step 816 text strings are retrieved from the memory 216, which correspond to the discovered faults and/or shutdowns, and they are written to the display page. If it is chosen in step 818 to write a record with the parameter data to the file, it is performed in step 820. If not, the control returns to step 804.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An engine monitoring and control system, comprising:
    a tested unit having a symbol table with addresses of monitored and controlled parameters of the tested unit;
    an external portable personal computer having a memory, a display, and a graphical user interface (GUI) responsive to user commands, for creating customized set of application-specific GUI display pages with icons and text, for displaying received parameter values, and for selecting commands and parameters from the displayed pages;
    a monitoring software program including a set of computer-executable program instructions running on the personal computer for retrieving the tested unit parameter values and controlling the tested unit performance; and
    a communication link between the tested unit and the personal computer;
    wherein the memory receives the symbol table before a test, and the monitoring software program dynamically updates a global arrays table using the addresses from the symbol table during the test, for recalculating necessary data locations, if needed.

2. The system according to claim 1, wherein the tested unit comprises an Auxiliary Power Unit (APU) Engine Control Unit (ECU).

3. The system according to claim 1, wherein the communication link is chosen from the group consisting of RS-232/422 communication interfaces using RS-232/422 communication protocol, ARINC 429/629 communication interfaces using PCMCIA protocol, analog I/O interfaces using PCMCIA protocol, and discrete I/O interfaces using PCMCIA protocol.

4. The system according to claim 3, wherein the ARINC 429/629 communication interface is usable by an external device for interaction with the monitoring software program, while the monitoring software program is communicating with the tested unit.

5. The system according to claim 1, wherein the external portable personal computer further comprises a data storage device for storing test results.

6. The system according to claim 1, wherein the monitoring software program is remotely controlled by a remote control system for off-site monitoring and control.

7. An engine monitoring and control system, comprising:
    a tested unit having a symbol table with addresses of monitored and controlled parameters of the tested unit;
    an external portable personal computer having a memory, a display, and a graphical user interface (GUI) responsive to user commands, for creating customized set of application-specific GUI display pages with icons and text, for displaying received parameter values, and for selecting commands and parameters from the displayed pages;
    a monitoring software program including a set of computer-executable program instructions running on the personal computer for retrieving the tested unit parameter values and controlling the tested unit performance; and
    a communication link between the tested unit and the personal computer;
    wherein the display pages include display pages with icons representing virtual gauges, instruments and control switches, strip chart display pages, and recorded faults pages.

8. A method for monitoring and controlling a tested engine system, comprising the following steps:
    (a) retrieving from the tested engine a symbol table having addresses of monitored and controlled parameters of the tested engine;
    (b) using an external portable personal computer with a memory, a display, and a graphical user interface (GUI) responsive to user commands, for creating customized set of application-specific GUI display pages with icons and text, for displaying received parameter values, and for selecting commands and parameters from the displayed pages; and
    (c) running on the personal computer a monitoring software program including a set of computer-executable program instructions for retrieving the tested engine parameter values and controlling the tested engine performance;
    wherein the memory receives the symbol table before a test, and the monitoring software program dynamically updates a global arrays table using the addresses from the symbol table during the test, for recalculating necessary data locations, if needed.

9. The method according to claim 8, wherein the tested engine comprises an Auxiliary Power Unit (APU) Electronic Control Unit (ECU).

10. The method according to claim 8, wherein the communication link is chosen from the group consisting of RS-232/422 communication interfaces using RS-232/422 communication protocol, ARINC 429/629 communication interfaces using PCMCIA protocol, analog I/O interfaces using PCMCIA protocol, and discrete I/O interfaces using PCMCIA protocol.

11. The method according to claim 10, wherein the ARINC 429/629 communication interface is usable by an external device for interaction with the monitoring software program, while the monitoring software program is communicating with the tested engine.

12. The method according to claim 8, wherein the external portable personal computer further comprises a data storage device for storing test results.

13. The method according to claim 8, wherein the monitoring software program is remotely controlled by a remote control system for off-site monitoring and control.

14. A method for monitoring and controlling a tested engine system, comprising the following steps:
    (a) retrieving from the tested engine a symbol table having addresses of monitored and controlled parameters of the tested engine;
    (b) using an external portable personal computer with a memory, a display, and a graphical user interface (GUI) responsive to user commands, for creating customized set of application-specific GUI display pages with icons and text, for displaying received parameter values, and for selecting commands and parameters from the displayed pages; and c) running on the personal computer a monitoring software program including a set of computer-executable program instructions for retrieving the tested engine parameter values and controlling the tested engine performance;

wherein the display pages include display pages with icons representing virtual gauges, instruments and control switches, strip chart display pages, and recorded faults pages.

15. An engine monitoring and control system, comprising:
   a tested unit having a symbol table with addresses of monitored and controlled parameters of the tested unit;
   an external portable personal computer having a memory, a display, and a graphical user interface (GUI) responsive to user commands, for creating customized set of application-specific GUI display pages with icons and text, for displaying received parameter values, and for selecting commands and parameters from the displayed pages;
   a monitoring software program including a set of computer-executable program instructions running on the personal computer for retrieving the tested unit parameter values, dynamically computing theoretical parameters, and controlling the tested unit performance; and
   a communication link between the tested unit and the personal computer;
   wherein said monitoring software program has full authority control over the engine.

16. The system according to claim 15, wherein the tested unit comprises an Auxiliary Power Unit (APU) Engine Control Unit (ECU).

17. The system according to claim 15, wherein the communication link is chosen from the group consisting of RS-232/422 communication interfaces using RS-232/422 communication protocol, ARINC 429/629 communication interfaces using PCMCIA protocol, analog I/O interfaces using PCMCIA protocol, and discrete I/O interfaces using PCMCIA protocol.

18. The system according to claim 17, wherein the ARINC 429/629 communication interface is usable by an external device for interaction with the monitoring software program, while the monitoring software program is communicating with the tested unit.

19. The system according to claim 15, wherein the external portable personal computer further comprises a data storage device for storing test results.

20. The system according to claim 15, wherein the monitoring software program is remotely controlled by a remote control system for off-site monitoring and control.

21. A method for monitoring and controlling a tested engine system, comprising the following steps:
   (a) retrieving from the tested engine a symbol table having addresses of monitored and controlled parameters of the tested engine;
   (b) using an external portable personal computer with a memory, a display, and a graphical user interface (GUI) responsive to user commands, for creating customized set of application-specific GUI display pages with icons and text, for displaying received parameter values, and for selecting commands and parameters from the displayed pages; and
   (c) running on the personal computer a monitoring software program including a set of computer-executable program instructions for retrieving the tested engine parameter values, dynamically computing theoretical parameters, and controlling the tested engine performance, wherein said monitoring software program has full authority control over the engine.

22. The method according to claim 21, wherein the tested engine comprises an Auxiliary Power Unit (APU) Electronic Control Unit (ECU).

23. The method according to claim 21, wherein the communication link is chosen from the group consisting of RS-232/422 communication interfaces using RS-232/422 communication protocol, ARINC 429/629 communication interfaces using PCMCIA protocol, analog I/O interfaces using PCMCIA protocol, and discrete I/O interfaces using PCMCIA protocol.

24. The method according to claim 23, wherein the ARINC 429/629 communication interface is usable by an external device for interaction with the monitoring software program, while the monitoring software program is communicating with the tested engine.

25. The method according to claim 21, wherein the external portable personal computer further comprises a data storage device for storing test results.

26. The method according to claim 21, wherein the monitoring software program is remotely controlled by a remote control system for off-site monitoring and control.

* * * * *